(12) United States Patent
Duck et al.

(10) Patent No.: US 10,710,178 B2
(45) Date of Patent: Jul. 14, 2020

(54) CUTTING ELEMENT, TOOL, AND METHOD FOR PRODUCING A HELICALLY EXTENDING, TRAPEZOIDALLY UNDERCUT GROOVE IN A CYLINDRICAL SURFACE OF A BORE

(71) Applicants: GUEHRING KG, Albstadt (DE); Grob-Werke GmbH & Co. KG, Mindelheim (DE)

(72) Inventors: Michael Duck, Bad Woerishofen (DE); Bernhard Gand, Eschweiler (DE); Michael Mueller, Warmisried (DE); Christoph Moerz, Tuerkheim (DE)

(73) Assignees: Guehring KG, Albstadt (DE); Grob-Werke GmbH & Co. XG, Mindelheim (DE)

( * ) Notice: Subject to any disclaimer, the term of this patent is extended or adjusted under 35 U.S.C. 154(b) by 0 days.

(21) Appl. No.: 15/695,416

(22) Filed: Sep. 5, 2017

(65) Prior Publication Data
US 2018/0065197 A1    Mar. 8, 2018

(30) Foreign Application Priority Data
Sep. 7, 2016    (DE) .................. 10 2016 216 926

(51) Int. Cl.
*B23B 27/06* (2006.01)
*B23D 43/00* (2006.01)
(Continued)

(52) U.S. Cl.
CPC ............ *B23D 43/005* (2013.01); *B23B 27/06* (2013.01); *B23B 41/12* (2013.01); *B23B 51/048* (2013.01);
(Continued)

(58) Field of Classification Search
CPC ... B23B 41/12; B23B 27/06; B23B 2215/242; B23B 2220/123; B23B 2222/14; B23C 5/207; B23C 2200/208; B23C 2200/204
See application file for complete search history.

(56) References Cited

U.S. PATENT DOCUMENTS 6,035,744 A    3/2000   Maier
2008/0138161 A1    6/2008   Wermeister
(Continued)

FOREIGN PATENT DOCUMENTS

CN    1878972 A    12/2006
CN    2858147 Y    1/2007
(Continued)

OTHER PUBLICATIONS

German Search Report (and translation provided by foreign counsel) from a corresponding German patent application dated May 4, 2017, 19 pages.
(Continued)

*Primary Examiner* — Sunil K Singh
*Assistant Examiner* — Paul M Janeski
(74) *Attorney, Agent, or Firm* — Burr & Brown, PLLC

(57) ABSTRACT

A cutting element for a tool to create a helically extending, trapezoidally undercut groove in a cylindrical surface of a bore. The cutting tool, preferably configured as a cutting insert, has groove-cutting teeth to create a symmetrically cross-sectioned groove which are arranged in series in a division harmonized with the pitch of the groove to be created. These groove-cutting teeth comprise at least one pre-machining tooth to create and machine a base groove and several trapezoidal teeth following the at least one pre-machining tooth, which have a tooth head profile which expands trapezoidally in cross-section in the vertical direction of the tooth with two flanks delimiting a flank angle for
(Continued)

further machining the base groove to a trapezoidally undercut final cross-section. The flank angle delimited by the two flanks increases from at least one trapezoidal tooth to a following trapezoidal tooth to a defined final dimension.

11 Claims, 3 Drawing Sheets

(51) Int. Cl.
  *B23B 41/12* (2006.01)
  *B23B 51/04* (2006.01)
  *B23B 51/08* (2006.01)

(52) U.S. Cl.
  CPC ........ *B23B 51/08* (2013.01); *B23B 2215/242* (2013.01); *B23B 2220/123* (2013.01); *B23B 2222/14* (2013.01); *B23B 2251/28* (2013.01)

(56) References Cited

U.S. PATENT DOCUMENTS

| 2008/0244891 A1 | 10/2008 | Iizumi et al. |
| 2010/0031799 A1 | 2/2010 | Ast et al. |
| 2015/0151369 A1 | 6/2015 | Gand et al. |

FOREIGN PATENT DOCUMENTS

| CN | 101119819 A | 2/2008 |
| CN | 102015166 A | 4/2011 |
| CN | 202283604 U | 6/2012 |
| DE | 10 2009 028 040 A1 | 2/2011 |
| DE | 10 2011 122 415 A1 | 6/2013 |
| DE | 10 2012 021 089 A1 | 6/2014 |
| DE | 10 2014 119 514 A1 | 6/2016 |
| DE | 10 2015 118 341 A1 | 4/2017 |
| EP | 0917927 A1 | 5/1999 |
| WO | 2010/015229 A1 | 2/2010 |

OTHER PUBLICATIONS

Chinese Examination Report (with English translation), Chinese Application No. 201710797814.6, dated Mar. 24, 2020 (19 pages).

CUTTING ELEMENT, TOOL, AND METHOD FOR PRODUCING A HELICALLY EXTENDING, TRAPEZOIDALLY UNDERCUT GROOVE IN A CYLINDRICAL SURFACE OF A BORE

CROSS-REFERENCE TO RELATED APPLICATION

This application claims the benefit of German Application 10 2016 216 926.2, filed Sep. 7, 2016, the entirety of which is incorporated herein by reference.

FIELD OF THE INVENTION

The invention concerns a cutting element, tool and method for creating a helically extending, trapezoidally undercut groove in a cylindrical surface of a bore.

BACKGROUND

It is well known that surfaces of metallic workpieces that are subject to high levels of tribological stress such as the piston running surfaces of cylinder sleeves or cylinder bores in cylinder crankcases are mechanically roughened in order to obtain a good adhesive basis for a surface coating, in particularly applied by means of thermal spraying.

For example, WO 2010/015229 A1 proposes machining a cylindrical surface of an aluminium cast part using a follow-on tool by successively machining a groove cross-section to its final dimensions by means of consecutively engaging machining teeth. The tool specified for this purpose is configured as a follow-on tool comprising a first tooth referred to as a drill-out tooth to drill out the cylindrical surface to a predefined nominal diameter, several cutting teeth following the drill-out tooth to create and machine a groove and a non-cutting shaping tooth referred to as a displacement tooth. The cutting teeth, which are arranged in a comb-like series with a division which corresponds to the pitch of the helically extending groove to be created, comprise among other things several pre-machining teeth for the creation and successive machining of a base groove and several trapezoidal teeth following the pre-machining teeth for the successive further machining of the base groove to a trapezoidally undercut final cross-section. The trapezoidal teeth, which are asymmetrical in their cross-section shape, successively widen a base groove previously created by the pre-machining teeth in such a way that they undercut the base groove initially on one flank and then on the other flank so as to obtain a trapezoidally undercut final cross-section as required. The trapezoidally undercut final cross-section guarantees a mechanical grouting between a coating applied to the cylinder surface by means of thermal spraying and the aluminium cast part which exhibits the cylindrical surface. The aim of the successive, one-sided groove flank machining by means of trapezoidal teeth which are asymmetrical in their cross-section shape is to ensure that so-called smearing does not occur on the tool, because this causes shaping imprecisions in the desired groove structure when relatively soft materials are machined such as aluminium.

DE 10 2014 119 514 A1 criticises that in the grooves created as described above, the edges extending on the surface side are relatively thin in configuration so that cracks can form in the applied coating at these points as a result, and also that due to the tool geometries determined by the edges, at least sections of the teeth can break away. In order to avoid these problems, DE 10 2014 119 514 A1 proposes a method by which a machining tool comprising several cutting teeth with cross-sections of differing symmetries is initially used to create a helically extending base groove in a cylindrical surface of a workpiece, this base groove then being successively machined to create a trapezoidally undercut cross-section. Specifically, the proposal is to use at least a first cutting tooth to create the base groove with boundary surfaces running at a slant in relation to normals extending from the surface so as to form a first symmetrical, provisional groove geometry of a depth which is less than the groove in its final groove geometry; to use at least a second cutting tooth to machine the base groove in extension of the boundary surfaces up to or approximately up to the bottom of the groove in its final groove geometry so as to create a second provisional groove geometry; to create chamfers on the groove in its final groove geometry with at least a third cutting tooth by removing sections to create a third provisional groove geometry at the same time, these sections each extending from the bottom of the groove and from a straight line drawn through the bottom of the groove and a normal intersecting the boundary surfaces at one point in each case, by which the desired length of the chamfer is determined; and with at least a fourth cutting tooth at the same time to create the bottom of the groove and the flanks of the undercuts of the groove in its final groove geometry.

The method proposed in DE 10 2014 119 514 A1 is conceived in the same way as the method or tool for machining a cylindrical surface, in particular of an aluminium cast part, as proposed in WO 2010/015229 A1. However, processing other materials is not addressed in the above documents. Cylinder sleeves and cylinder crankcases are frequently made of other cast iron materials such as grey cast iron. Cast iron, e.g. grey cast iron, differs from aluminium in terms of its machinability and chip formation. For example, when machining cast iron such as grey iron, tearing chips (discontinuous chips) are formed which are torn out of the workpiece. Due to this tearing out of the chips, the surface of the workpiece has an undefined roughness. However, the tools and methods developed for machining aluminium cast parts as specified in the documents discussed above are only suitable to a limited extent or not at all for machining cast iron materials. On the contrary, special cutting profiles are required for machining cast iron, for example grey cast iron.

SUMMARY OF THE INVENTION

The object of the invention is to provide a cutting element and a method to create a helically extending, trapezoidally undercut groove with a defined micro and macro structure in a cylindrical surface of a bore in a cast iron workpiece, in particular a grey cast iron workpiece, or in a cast iron sleeve in an aluminium housing, in particular in a cylindrical surface, which after being coated provides the piston running surface of a cylinder sleeve made of grey cast iron or a cylinder bore in a grey cast iron cylinder crankcase of a combustion engine.

This object is achieved by means of cutting elements in accordance with aspects of the present invention, tools in accordance with aspects of the present invention, and methods in accordance with aspects of the present invention. Advantageous embodiments of cutting elements in accordance with the present invention are also described herein.

A cutting element according to the invention for machining a cylindrical surface of a bore in a cast iron workpiece, in particular a grey cast iron workpiece, in particular a cylindrical surface which after being coated provides the cylinder running surface of a grey cast iron cylinder sleeve or a cylinder bore in a grey cast iron cylinder crankcase of a combustion engine, has several groove-cutting teeth to create a helically extending, symmetrically cross-sectioned, trapezoidally undercut groove. The groove-cutting teeth are therefore arranged in series with a division harmonised with the pitch of the groove to be created, e.g. with a division which is two times the pitch (or any whole-numbered multiple of the pitch). A desired groove cross-section is therefore created by means of successively engaging machining or non-machining (redundant) groove-cutting teeth and processed to its final dimensions. The groove-cutting teeth comprise at least one pre-machining tooth to create and machine a base groove and several trapezoidal teeth following the at least one pre-machining tooth which have a symmetrically cross-sectioned tooth head profile which expands trapezoidally in the vertical direction of the tooth with two flanks delimiting a flank angle for further machining of the base groove to a desired trapezoidally undercut final cross-section. According to the invention, the flank angle delimited by the two flanks of the trapezoidal profile increases from at least one trapezoidal tooth to a subsequent trapezoidal tooth to a defined final dimension.

By means of the cutting element according to the invention and with the aid of geometrically determined cutting teeth, the two flanks of a base groove inserted in a cylindrical surface are machined simultaneously, but in such a way that the flank angle enclosed between the flanks is enlarged successively, i.e. in at least two cutting stages, to a defined final dimension. The successive machining of the cylindrical surface in a workpiece made of cast iron, in particular grey cast iron, by means of geometrically defined cutting teeth, makes it possible to keep material removal at the two groove flanks at a low level. The tearing chips created are therefore small, which means that fewer rough machining surfaces are preserved than if the two groove flanks were to be cut in a single stage. This makes it possible to ensure a high degree of reproducibility of the groove cross-section.

The trapezoidal teeth have a tooth head profile which expands trapezoidally in the vertical direction of the tooth. The tooth height is measured vis-à-vis an axis of the reference level at the cutting element that is parallel to the groove to be created, for example a common tooth base level, so "expands trapezoidally in the vertical direction of the tooth" means that the cross-section profile of the trapezoidal teeth tapers off in the opposite direction, i.e. towards the reference level at the cutting element or in the direction from the tooth head to the tooth base. Due to the fact that the tooth head profile expands trapezoidally in the vertical direction of the tooth, trapezoidally undercut groove cross-sections with positive undercut angles are created in the cylindrical surface.

In this way, a cutting element according to the invention differs from a cutting element in a tool proposed by WO 2010/015229 A1 and DE 10 2014 119 514 A1, by means of which the two flanks of the base groove are either machined in succession or at the same time in such a way that the flank angle is machined to its final dimension in a single cutting stage. Furthermore, unlike the cutting element known from WO 2010/015229 A1, the cutting element according to the invention also has only cutting teeth, i.e. teeth for the purpose of machining, of which at least the trapezoidal teeth, but preferably also the pre-machining teeth, exhibit a geometrically modelled symmetrical cross-section profile. All groove-cutting teeth can therefore have a symmetrically cross-sectioned tooth head profile.

Due to the successive enlargement of the flank angle of the trapezoidal teeth, which is equivalent to a widening of the cross-section of the trapezoidal teeth, the forces impacting on the teeth during machining of the cylindrical surface can be effectively controlled, which makes it possible to achieve a high degree of reproducibility of a desired groove cross-section.

In initial attempts, it was possible to demonstrate that using the cutting element according to the invention, a satisfactory and cost-efficient result can be achieved in roughening a cylindrical surface in a cast iron workpiece, in particular a grey cast iron workpiece, by means of machining a helically extending, precisely configured groove with dimensions (depth, breath) in the µm range, i.e. within a range of 30 to 150 µm, for example.

The multiple trapezoidal teeth comprise at least a first trapezoidal tooth with a first flank angle of for example 12° and at least a second trapezoidal tooth with a second flank angle of for example 24°. In the simplest case therefore, a first trapezoidal tooth is provided followed by a second trapezoidal tooth. In a preferred embodiment, a first trapezoidal tooth is provided followed by three second trapezoidal teeth, for example. In contrast to the simplest case, the preferred embodiment therefore comprises several redundant second trapezoidal teeth. Redundant teeth help ensure that even in the event of tool wear, it is possible to create a consistent groove geometry, and the redundant teeth also have the effect of cleaning the groove already created or machined.

Deviating from this, the cutting element can comprise at least an additional third (fourth, etc.) trapezoidal tooth with a larger flank angle as compared to the at least one first trapezoidal tooth and the at least one second trapezoidal tooth. The flank angle of the trapezoidal teeth can then increase for example over at least two stages, for example from 12° to 18° and from 18° to 24°. As already suggested in brackets, a fourth trapezoidal tooth with an even larger flank angle of for example 32° could follow, etc.

All groove-cutting teeth or at least the trapezoidal teeth responsible for the final cross-section of the groove to be created preferably exhibit rounded corners, e.g. defined by specified radiuses. The rounded corners increase the cost efficiency of the tool. Due to the undercuts created at the two groove flanks, a sound, positive grouting is nonetheless achieved between a coating applied to the roughened cylindrical surface and the workpiece.

In a preferred embodiment, the excess dimensions of the trapezoidal teeth as compared to an axis of the reference level at the cutting element parallel to the groove to be created, for example a common tooth base level of the groove-cutting teeth, are the same, so that the first trapezoidal tooth already determines the final depth of the trapezoidal cross-section of the groove to be created and the subsequent trapezoidal tooth or teeth merely enlarge the flank angle to a defined final dimension. When the depth of the groove successively approaches the final depth due to the action of the pre-machining teeth, the load on the flanks of the trapezoidal teeth creating the groove undercuts can be kept at a low level.

Good pre-machining of the workpiece surface is especially achieved with several pre-machining teeth, each of which exhibit or combine identical or differing cross-section profiles. In the same way as the trapezoidal teeth, the pre-machining teeth can also comprise one or more redundant pre-machining teeth so as to be able to create a consistent groove cross-section in spite of tool wear and, in the event of malfunction of one or more pre-machining teeth, to be able to machine the base groove to the desired final cross-section.

As such, the pre-machining teeth can exhibit, for example, one or more circular teeth with a round, in particular circular, tooth head profile. In the case of several circular teeth, the excess dimensions as compared to the above-mentioned reference level of at least one circular tooth to one subsequent circular tooth can be identical or increase in such a way that the cross-section of the base groove to be created becomes successively deeper. In a preferred embodiment, provision is made for one circular tooth. In spite of this, the cross-section profiles of the multiple circular teeth can be identical or increase in size (excess dimension as compared to the above-mentioned reference level) and/or radius. Due to the cross-section enlargement achieved in this way, the forces acting on the circular teeth can be effectively controlled.

Alternatively to the circular teeth or in addition to the circular teeth, the pre-machining teeth can exhibit at least one rectangular tooth with a tooth head profile whose cross-section corresponds to a rectangle with rounded corners. As in the circular teeth, the cross-section of the at least one rectangular tooth can change in width and/or in height (excess dimension as compared to the above-mentioned reference level).

However, a maximum excess dimension (as compared to the above-mentioned reference level) of the trapezoidal teeth can be smaller than a maximum excess dimension (as compared to the above-mentioned reference level) of the at least one pre-machining tooth. In this way, a groove cross-section can be formed with a for example round recess at the bottom of the finished groove, created by the pre-machining teeth.

What is more, the cutting element can exhibit a drill-out tooth which precedes the groove-cutting teeth for the purpose of drilling out the bore to the specified nominal diameter. In this case, the drill-out tooth can originate from the above-mentioned reference level at the cutting element.

The cutting element with the groove-cutting teeth and if necessary the optionally provided drill-out tooth can be configured as a cutting insert, for example an indexable insert, which is preferably made of carbide and advantageously has a wear protection coating.

Alternatively, however, the groove-cutting teeth and if necessary the optionally provided drill-out tooth can, e.g. based on the model of WO 2010/015229 A1, be formed in a prism-shaped or cuboid-shaped cutting body made of hard material, for example PCD, CBN or cermet, which is fitted on a carrier made of carbide. The cutting element consisting of the carrier and the cutting body can, as in the above case in which the cutting element is made of carbide, be formed in the shape of a cutting insert, for example an indexable insert.

The cutting element can be fixed onto the base unit of a tool with rotary drive capacity so as to be adjustable in a radial and/or axial direction.

BRIEF DESCRIPTION OF THE DRAWING FIGURES

A preferred embodiment of the invention is explained in more detail below based on schematic drawings. The following are shown:

DETAILED DESCRIPTION OF THE INVENTION

In the following, a tool (assembly) is initially described with which a cylindrical inner surface of a bore in a workpiece, e.g. a piston running surface in a cylinder sleeve or a cylinder bore in a cylinder crankcase, made of cast iron, in particular grey cast iron, is machined in such a way that a coating can be applied in serial production by means of a thermal spraying method.

In order for the material applied by means of thermal spraying to adhere effectively to the workpiece, it is necessary to roughen the workpiece, i.e. give it a particular surface so that it is possible to realize the interlock between the layer of material applied by thermal spraying and the workpiece across the entire workpiece surface reproducibly and in consistent quality. When machining cylinder sleeves, for example, the cylindrical inner surface has an axial length of some 130 mm in the car sector, and up to more than 400 mm in the commercial vehicle sector, whereby extremely narrow cylinder shape tolerances and degrees of surface roughness have to be observed. A cutting element according to the invention is conceived so as to make a helically extending groove with a predefined geometry in the already very precisely pre-machined cylindrical workpiece surface, as will be described in detail in the following.

Figure 1:
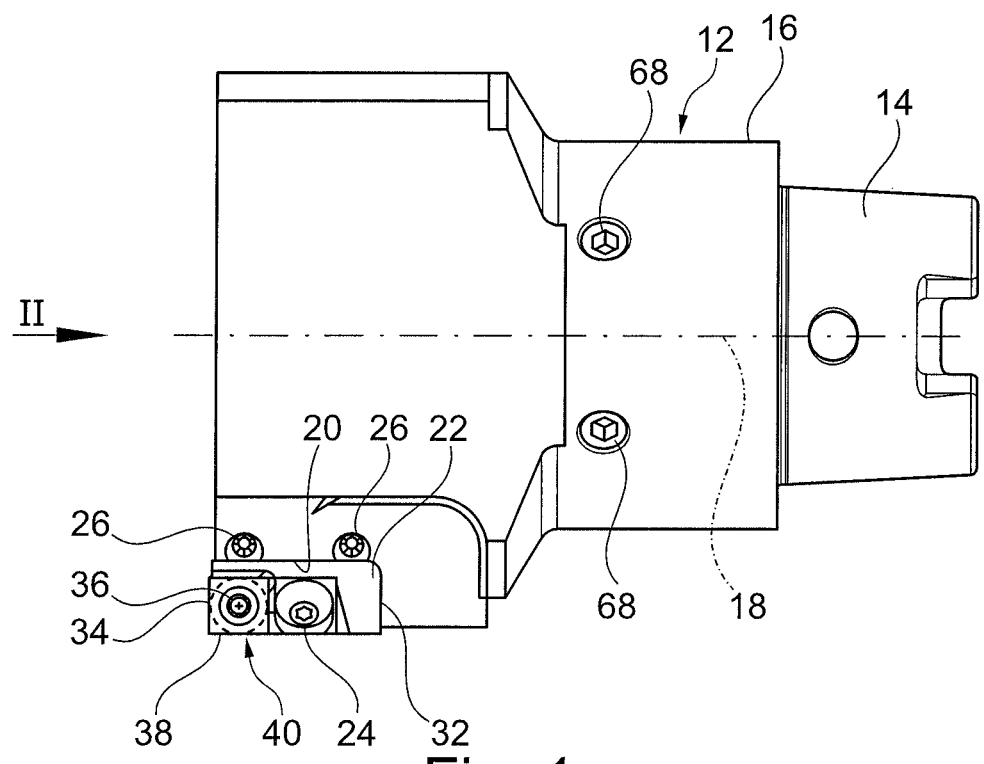
FIG. 1 shows a side view of a tool (assembly) with a cutting element according to the invention in the form of a cutting insert to create a cylindrical surface which has a geometry determined by a surface structure prepared for the application of material by means of thermal spraying.

The tool with rotary drive capacity is shown in FIG. 1 with the reference numeral 12. In the embodiment shown, it has an interface 14 on the machine tool side with a hollow shank taper (HSK), to which a base unit 16 is connected. The axis of the tool 12 bears the reference numeral 18. The depiction shows that the tool 12 is an extremely rigid and dimensionally stable tool, which is a requirement for the cylindrical inner surface of the workpiece made of cast iron, in particular grey cast iron, to be capable of being machined with the predefined cylinder shape precision.

Figure 2:
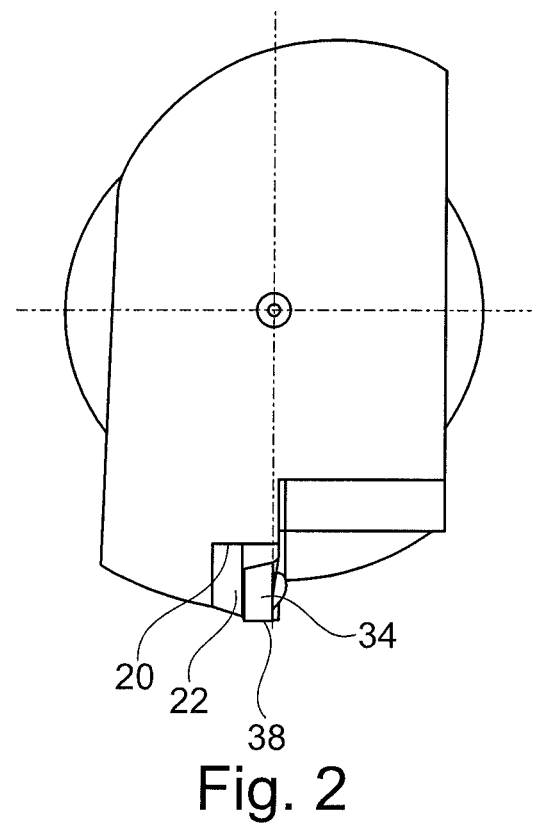
FIG. 2 shows a front view of the tool from FIG. 1 according to "II" in FIG. 1.

In a pocket of the base unit 16 bearing the numeral 20 there is a tool cartridge 22, which, as can be seen in FIG. 1 and FIG. 2, essentially has the shape of a cube and can be tensioned by means of a tensioning screw 24 against two interior surfaces of the pocket 20 which are at an angle to one another. Taper pins bearing the reference numeral 26 can be adjusted using suitable tools, e.g. using a hex wrench, so as to align the cartridge 22 in relation to the axis 18. It goes without saying that for this reason, the tensioning screw 24 penetrates a corresponding bore in the cartridge at an angle to the two contact surfaces of the pocket 20 so as to enable such fine adjustments of the tool cartridge 22.

Provision may also be made for the cartridge 22 to be kept adjustable in an axial direction, preferably finely adjustable, by means of an adjustment bolt not shown in detail here which is contact with a frontal surface 32 of the cartridge 22 and is essentially pressed or screwed radially into the base unit 16. The tool cartridge 22 itself holds a cutting element according to the invention which in the embodiment shown is formed as a cutting insert 34 which is removably attached to the tool cartridge 22 by means of a central attachment screw 36 which interacts with an opening 35 in the cutting insert 34.

In the embodiment shown, the cutting insert 34 is made of carbide and has a wear protection coating. It can be seen from the depiction according to FIGS. 1 and 2 that the cutting insert 34 at the side edge 38, which can be aligned parallel to the tool axis 18, i.e. parallel to the axis of the helically extending groove to be created and therefore to the cylindrical workpiece surface, essentially has an extremely fine tooth structure 40 along the entire length of the cutting insert 34 which enables a groove structure with a precisely predefined geometry to be created in a cylindrical workpiece surface. As already mentioned, a groove is to be created which extends in a thread-like or helical manner along the entire axial length of the cylindrical workpiece surface and which in the embodiment has a depth D (see FIG. 6) of 0.12 mm and a total width W of 0.3 mm. The elevation or pitch S of the groove 52 in the embodiment is 0.6 mm. The division by means of which the subsequently described groove cutting teeth are allocated to the fine interlock of the cutting insert 34 is twice the pitch S of the groove 52, so that one groove path always remains blank during machining of the bore wall.

In order to create this groove 52, the cutting insert 34 is fitted with a special interlock 40 which is described below in more detail in reference to FIGS. 3 to 6.

Figure 3:
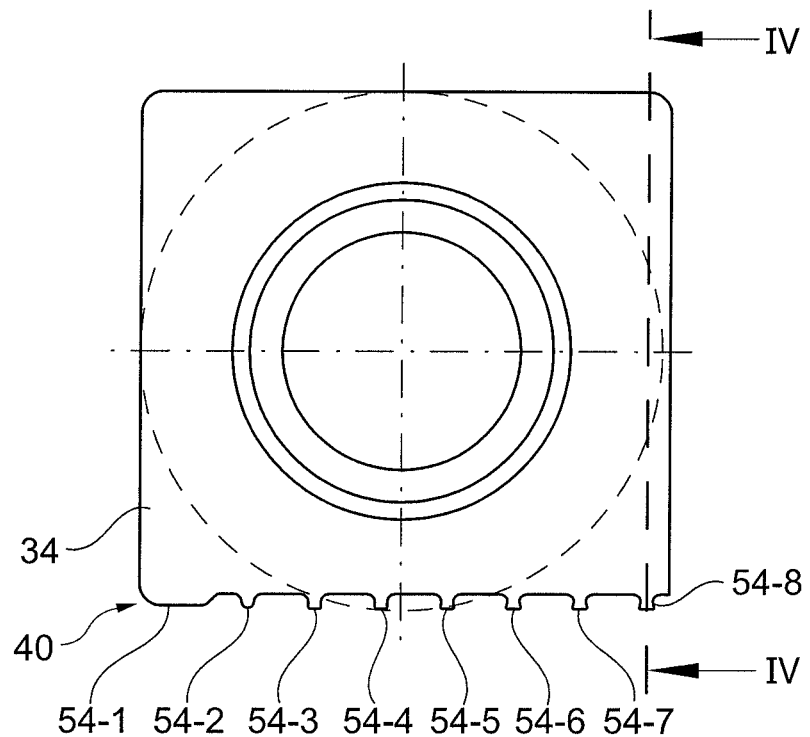
FIG. 3 shows a top view of the cutting insert from FIGS. 1 and 2 to a much enlarged scale.
Figure 4:
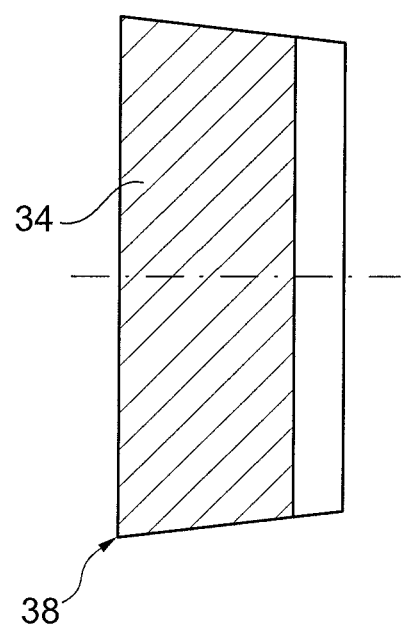
FIG. 4 shows a "IV-IV" cross-section through the cutting insert in FIG. 3.

FIG. 3 shows a top view of the cutting insert 34 to a much enlarged scale. FIG. 4 shows a cross-section through the cutting insert according to "IV-IV" in FIG. 3. FIG. 5 shows, once again to a much enlarged scale, a top view of the cutting segment of the cutting insert which exhibits the interlock 40. Finally, FIG. 6 shows a cross-section through a path of a trapezoidally undercut groove 52 created with the tool according to FIG. 1.

Figure 5:
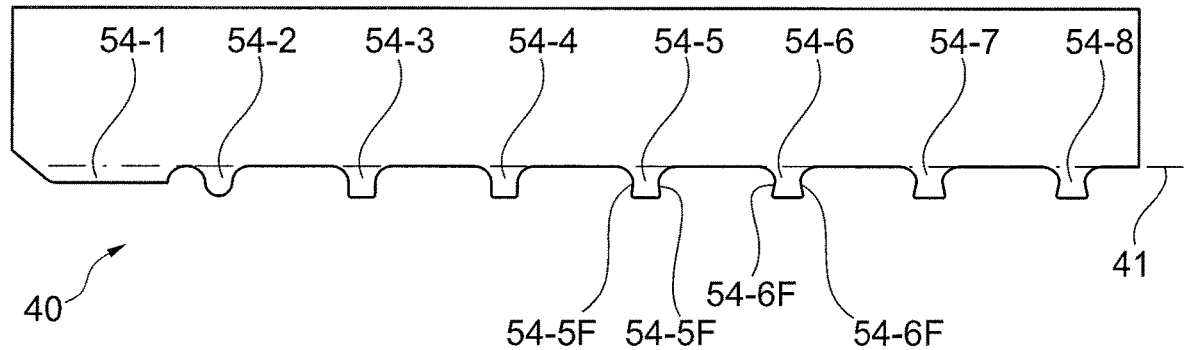
FIG. 5 shows a much enlarged top view of a cutting segment of the cutting insert.
Figure 6:
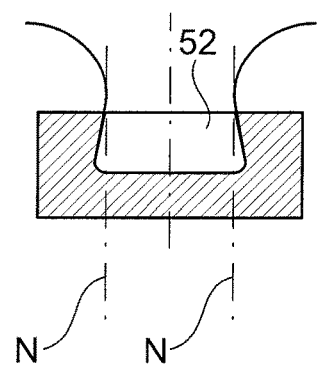
FIG. 6 shows a cross-section through a path of a trapezoidally undercut groove created with the tool according to FIG. 1.

The length and width of the cutting insert 34 in the embodiment shown is 9.525 mm. The height of the cutting insert 34 is 3.97 cm in the embodiment shown. The groove-cutting teeth with the reference numerals 54-1 to 54-8 exhibit the following geometry:

At the axially extending end of the side edge 38 of the cutting insert 34 there is first a drill-out tooth 54-1 (cf. FIG. 3 and FIG. 5). The diameter size of the drill-out tooth 54-1 is selected in such a way that the drill-out tooth 54-1 essentially lies on the desired nominal diameter of the cylindrical surface of the workpiece when adjustment of the tool cartridge 22 is complete. The effective width of the drill-out tooth is 0.9 mm and is therefore larger than the pitch S of the groove to be created.

Next to the drill-out tooth 54-1 there follow pre-machining teeth 54-2 to 54-4, each with a division equal to twice the pitch S. The three pre-machining teeth comprise as a first tooth a circular tooth 54-2 with a circular cross-section tooth head profile in the area of the excess dimension as compared to the drill-out tooth 54-1, followed by two rectangular teeth 54-3 and 54-4 with a tooth head profile corresponding to a rectangular cross-section with rounded corners. The circular tooth 54-2 sinks into the workpiece surface pre-machined with the drill-out tooth 54-1 with a defined excess dimension of 0.11 mm as compared to the drill-out tooth 54-1 and creates a base groove which is successively machined further by the two rectangular teeth 54-3 and 54-4, in particular enlarged in its cross-section and cleaned. The two rectangular teeth 54-3 and 54-4 exhibit the same excess dimension as the circular tooth 54-2. The first rectangular tooth 54-3 expands the circular cross-section of the base groove cut with the circular tooth to an essentially rectangular cross-section. The second rectangular tooth 54-4 has the same tooth head profile as the first rectangular tooth 54-4 and is therefore redundant.

The three pre-machining teeth 54-2 to 54-4 are each followed by four trapezoidal teeth 54-5 to 54-8 with a division which is twice the pitch S, including a first trapezoidal tooth 54-4 with a first flank angle of 12° and three second trapezoidal teeth 54-5 to 54-8 with a larger second flank angle of 24°. The first trapezoidal tooth 54-5 expands the cross-section of the base groove created by the pre-machining teeth 54-2 to 54-4 to a trapezoidally undercut cross-section with a flank angle of 12°. The other trapezoidal teeth 54-6 to 54-8 finally enlarge the flank angle to 24°. The first trapezoidal tooth 54-5 therefore has a narrower tooth head profile with a flank angle of 12° delimited by the two flanks 54-5F, while the second trapezoidal tooth 54-6 has a wider tooth head profile with a flank angle of 24° delimited by the two flanks 54-6F. With the engagement of the second trapezoidal tooth 54-6, a trapezoidally undercut groove 52 is thus created with a cross-section according to FIG. 6, i.e. with a depth of 0.12 mm and a total width at the bottom of the groove of 0.3 mm. The third and fourth trapezoidal tooth 54-7 and 54-8 are redundant. They are identical in tooth head profile, depth and width to the second trapezoidal tooth 54-6 and merely serve to clean the trapezoidally undercut groove 52 created by the trapezoidal teeth 54-5 and 54-6. FIG. 5 shows that the trapezoidal teeth 54-5 to 54-8 have the same excess dimension of 0.11 mm as compared to the drill-out tooth 54-1 as in the case of the pre-machining teeth 54-2 to 54-4.

FIG. 5 and FIG. 6 also show that the trapezoidal teeth 54-5 to 54-8 have rounded corners. As such, all groove-cutting teeth have rounded corners, in particular defined by specified radiuses.

The trapezoidal teeth 54-5 to 54-8 thus successively widen the base groove previously formed by the pre-machining teeth 54-2 to 54-4 in the area of the bottom of the groove—in two stages in the embodiment shown—to a final cross-section as shown in FIG. 6. Each trapezoidal tooth machines, i.e. cuts or cleans, the previously created groove on both ground flanks at the same time.

The trapezoidal teeth 54-5 to 54-8 have a tooth head profile which expands trapezoidally in the vertical direction of the tooth, i.e. towards the tooth head. The tooth height is measured from a (fictitious) reference level at the cutting insert 34 shown in FIG. 5 by means of reference numeral 12. The reference level extends parallel to the axis of the groove 52 to be created which corresponds to the axis 18 of the tool 12, and in the embodiment shown it can also be interpreted as a common tooth base level, "expands trapezoidally in the vertical direction of the tooth" means that the cross-section profile of the trapezoidal teeth tapers in the opposite direction, i.e. towards the reference level 41 or in a direction from the tooth head to the tooth base. Due to the fact that the tooth head profile expands trapezoidally in the vertical direction of the tooth, groove cross-sections with positive undercut angles are created in the cylindrical surface as can be clearly seen in FIG. 6. FIG. 6 shows that both groove flanks of the finished groove 52 are positioned with a positive undercut angle opposite normal levels N, N of the finished groove 52, as indicated in FIG. 6 by means of dotted lines.

The configuration of the cutting insert 34 as described above results in the following mode of action in creating the cylindrical inner surface with predefined surface structure.

The tool 12 is aligned concentrically to the pre-machined cylindrical surface with its axis 18 in such a way that the radial clearance of the tooth head of the drill-out tooth 54-1 is essentially equivalent to half the cylinder surface diameter of the cylindrical workpiece surface. Once the cartridge 22 has been previously aligned using the adjustment facilities (eccentric pins 26) in such a way that the tooth heads of the groove-cutting teeth 54-2 to 54-8 are essentially aligned parallel to the tool axis 18 so that the tooth line stands perpendicular on the helically extending groove 52 to be created (cf. FIG. 6), the tool can be moved into the inner bore. A relative rotational motion is then generated between the tool 12 and the cylindrical workpiece surface and at the same time an axial relative shifting motion between the tool 12 and workpiece such that the following applies:

$$V_R = nR \times S$$

where $V_R$ is the axial relative speed between the tool 12 and the workpiece, nR is the relative rotational speed between the tool and the workpiece and S is the pitch.

In order to create the helically extending, trapezoidally undercut groove 52 in the embodiment shown, a nominal diameter is initially applied to the cylindrical surface to be roughened using the drill-out tooth 54-1 of the cutting insert 34 of the tool described above. Then the pre-machining teeth 54-2 to 54-4 successively create and machine a base groove in the width of two groove flanks, which is subsequently trapezoidally undercut in cross-section by means of further machining by the trapezoidal teeth 54-5 to 54-8. For cast iron machining, in particular grey cast iron machining, according to the invention, the two flanks of the base groove are simultaneously further machined in such a way that the flank angle delimited by the flanks is successively expanded in the embodiment described above in two stages to a defined final angle of the groove 52 to be created.

The tool 12, or the interlock 40 of the cutting element 14 attached to the tool 12, was described above according to the first embodiment. However, the invention is not limited to the interlock configuration described above. In particular, the dimensions shown in the figures are only examples and are therefore not to be regarded as limiting the scope of protection of the invention as described herein.

Deviations from the embodiment described are of course possible without abandoning the underlying notion of the invention as described herein.

In the embodiment shown, the multiple trapezoidal teeth comprise a first trapezoidal tooth with a first flank angle of 12° and three second trapezoidal teeth with a second flank angle of 24°. Deviating from this, the cutting element can comprise at least an additional third (fourth, etc.) trapezoidal tooth with a larger flank angle as compared to the at least one first trapezoidal tooth and the at least one second trapezoidal tooth. The flank angle of the trapezoidal teeth can then increase for example over at least two stages, for example from 12° to 18° and from 18° to 24°.

Furthermore, the profile of the pre-machining teeth can deviate from the embodiment shown. The pre-machining teeth can differ in terms of the number and combination of circular and rectangular teeth provided as compared to the embodiment discussed above. The only decisive factor is that the pre-machining teeth create a base groove by means of machining whose cross-section successively approaches that of the finished groove, while the trapezoidally undercut cross-section of the finished groove is then successively created by means of the trapezoidal teeth in at least two cutting or machining stages.

In the embodiments described, the cutting insert bearing the cutting element is designed as a disposable cutting insert. Deviating from this, however, the cutting insert can also be configured as an indexable insert which can comprise two interlocks or cutting segments according to the invention which are arranged opposite to each other or at right angles, for example.

Deviating from the embodiment described above, it is also conceivable to fit the tool with several cutting elements which are distributed across its circumference. In this case, the grooves could then be cut in the manner of a multi-start thread.

If the tool according to FIG. 1 is fitted with a single cutting insert, it can be advantageous to fit the base unit of the tool with guide rails distributed across its circumference which ensure that the tool is securely guided in the workpiece bore in combination with the drill-out tooth.

FIG. 1 shows two balancing screws bearing the reference numeral 68 which enable fine balancing of the tool in order not to impair the required shape precision of the cylinder.

The invention claimed is:

1. Cutting element for a tool to create a helically extending, trapezoidally undercut groove in a cylindrical surface of a bore, the cutting element comprising:
a series of groove-cutting teeth to create a symmetrically cross-sectioned groove, each groove-cutting tooth spaced from a next-in-series or a prior-in-series groove-cutting teeth in the series by a whole-numbered multiple of a pitch, the series of groove-cutting teeth comprising at least one pre-machining tooth to create and machine a base groove and several trapezoidal teeth following the at least one pre-machining tooth, each trapezoidal tooth is trapezoidal in shape and has a tooth head profile with a cross-section that is larger at a head of the tooth than at a base of the tooth, with two flanks delimiting a flank angle for further machining the base groove to a trapezoidally undercut final cross-section, wherein
each of the groove-cutting teeth has a symmetrically cross-sectioned tooth head profile, and
the flank angle delimited by the two flanks of the trapezoidally shaped tooth head profile increases from at least one trapezoidal tooth to a following trapezoidal tooth to a defined final dimension.

2. Cutting element according to claim 1, wherein each of the groove-cutting teeth is spaced from a next-in-series or a prior-in-series groove-cutting teeth in the series by twice the pitch.

3. Cutting element according to claim 1, wherein the several trapezoidal teeth comprise at least a first trapezoidal tooth and a second trapezoidal tooth, the first trapezoidal tooth having a first flank angle, the second trapezoidal tooth having a second flank angle, and the second flank angle is greater than the first flank angle.

4. Cutting element according to claim 1, wherein the groove-cutting teeth exhibit rounded corners.

5. Cutting element according to claim 1, wherein:
a reference plane extends through the base of each groove-cutting tooth,
each of the trapezoidal teeth has a respective dimension from the reference plane to the head of the tooth, and
each of the respective dimensions is the same.

6. Cutting element according to claim 1,
wherein the at least one pre-machining tooth comprises at least one circular tooth which has a tooth head profile that is circular in cross-section.

7. Cutting element according to claim 1, wherein at least one pre-machining tooth comprises at least one rectangular tooth which has a tooth head profile cross-section that is rectangular with rounded corners.

8. Cutting element according to claim 1, wherein the cutting element is configured as a cutting insert made of carbide.

9. Cutting element according to claim 1, wherein the cutting element further comprises a drill-out tooth which precedes the groove-cutting teeth for drilling out the bore to a specified nominal diameter.

10. Tool with rotational drive capacity with an interface on the machine tool side and a base unit attached to the interface, characterized by a cutting element according to claim 1 attached to the base unit.

11. Method for creating a helically extending, trapezoidally undercut groove in a cylindrical surface of a bore, the method comprising:
- cutting a base groove, delimited in width by two flanks, into the cylindrical surface of a bore drilled out to a specified nominal diameter, and
- subsequently trapezoidally undercutting in cross-section the base groove by means of simultaneously machining of the two flanks, wherein
- the flank angle delimited by the two flanks of the base groove is successively expanded in at least two stages to a defined final angle of the groove to be created.

* * * * *

UNITED STATES PATENT AND TRADEMARK OFFICE
CERTIFICATE OF CORRECTION

| | | |
|---|---|---|
| PATENT NO. | : 10,710,178 B2 | Page 1 of 1 |
| APPLICATION NO. | : 15/695416 | |
| DATED | : July 14, 2020 | |
| INVENTOR(S) | : Duck et al. | |

It is certified that error appears in the above-identified patent and that said Letters Patent is hereby corrected as shown below:

On the Title Page

<u>Assignees, Item (73)</u>
Please change: "Assignees: Guehring KG, Albstadt (DE); Grob-Werke GmbH & Co., XG, Mindelheim (DE)" to -- Assignees: Guehring KG, Albstadt (DE); Grob-Werke GmbH & Co., KG, Mindelheim (DE) --

Signed and Sealed this
Sixth Day of October, 2020

Andrei Iancu
*Director of the United States Patent and Trademark Office*